(12) United States Patent
Mason

(10) Patent No.: US 7,216,104 B2
(45) Date of Patent: May 8, 2007

(54) DISALLOW PAYMENT FOR E-BILLING SYSTEM

(75) Inventor: Elaine Scott Mason, Stone Mountain, GA (US)

(73) Assignee: Verizon Business Global LLC, Basking Ridge, NJ (US)

(*) Notice: Subject to any disclaimer, the term of this patent is extended or adjusted under 35 U.S.C. 154(b) by 1146 days.

(21) Appl. No.: 09/805,631

(22) Filed: Mar. 14, 2001

(65) Prior Publication Data

US 2001/0051918 A1    Dec. 13, 2001

Related U.S. Application Data

(60) Provisional application No. 60/189,225, filed on Mar. 14, 2000.

(51) Int. Cl.
*G06Q 40/00*    (2006.01)

(52) U.S. Cl. ........................................ 705/40
(58) Field of Classification Search ............ 705/40
See application file for complete search history.

(56) References Cited

U.S. PATENT DOCUMENTS

| | | | |
|---|---|---|---|
| 5,603,025 A | 2/1997 | Tabb et al. | |
| 5,699,528 A | 12/1997 | Hogan | |
| 5,724,584 A | 3/1998 | Peters et al. | |
| 5,787,416 A | 7/1998 | Tabb et al. | |
| 5,832,460 A | 11/1998 | Bednar et al. | |
| 5,850,448 A * | 12/1998 | Ganesan et al. | 705/64 |
| 5,870,473 A * | 2/1999 | Boesch et al. | 705/78 |
| 5,884,284 A | 3/1999 | Peters et al. | |
| 5,884,288 A | 3/1999 | Chang et al. | |
| 5,903,881 A | 5/1999 | Schrader et al. | |
| 5,909,485 A | 6/1999 | Martin et al. | |
| 5,956,700 A | 9/1999 | Landry | |
| 5,963,925 A | 10/1999 | Kolling et al. | |
| 5,970,476 A | 10/1999 | Fahey | |

(Continued)

FOREIGN PATENT DOCUMENTS

| | | |
|---|---|---|
| WO | 98/58339 | 12/1998 |
| WO | 99/13421 | 3/1999 |

OTHER PUBLICATIONS

Michaelas, Nicos; Chittenden, Francis; Poutziouris, Panikkos. "Pay and Save". Accountancy. London, Jun. 1999. vol. 123, Iss. 1270; p. 92. Retrieved from ProQuest Nov. 30, 2005. (2 pages).*

(Continued)

*Primary Examiner*—Richard E. Chilcot, Jr.
*Assistant Examiner*—Jennifer L. Liversedge

(57) ABSTRACT

A payment disallow mechanism for an e-billing system including a computer system accessible for on-line interactive communication of invoices to users. The computer system including a database for storing customer invoice information, the information including an invoice date and an total invoice amount for display to said customer for on-line interaction; a mechanism for initiating electronic payment of the modified total invoice amount via the e-billing system, and a mechanism for determining whether the total invoice amount is a zero balance or credit balance prior to executing the electronic payment, wherein in response to determination of the zero or credit balance, the mechanism terminating the payment mechanism and generating a disallow payment message for display to the customer.

37 Claims, 6 Drawing Sheets

U.S. PATENT DOCUMENTS

| | | |
|---|---|---|
| 5,978,780 A | 11/1999 | Watson |
| 5,991,750 A | 11/1999 | Watson |
| 5,995,946 A | 11/1999 | Auzennf et al. |
| 6,047,268 A | 4/2000 | Bartoli et al. |
| 6,052,671 A | 4/2000 | Crooks et al. |
| 6,067,525 A | 5/2000 | Johnson et al. |
| 6,289,322 B1 * | 9/2001 | Kitchen et al. ............... 705/40 |
| 6,496,744 B1 | 12/2002 | Cook |
| 6,616,458 B1 | 9/2003 | Walker et al. |
| 2001/0018673 A1 | 8/2001 | Goldband et al. |
| 2001/0037297 A1 * | 11/2001 | McNair ...................... 705/40 |
| 2001/0047347 A1 | 11/2001 | Perell et al. |
| 2002/0026410 A1 | 2/2002 | Woloshin et al. |
| 2002/0131561 A1 | 9/2002 | Gifford et al. |

OTHER PUBLICATIONS

Hayes, Heather. "E-forms Learn New Lanuguage". Federal Computer Week. Falls Church, Feb. 21, 2000. Vol. 14, Iss. 4; p. 32. Retrieved from ProQuest Nov. 30, 2005. (3 pages).*

Electronic Bill Payment/Presentment Business Practices, Council for Electronic Billing and Payment of the NACHA, Jun. 4, 1999, Edition 1.0, pp. 1-28, entire document.

M. Betta, Start Paying Invoice Once, Not Twice, Computerworld, vol. 27, No. 14, Apr. 5, 1993, p. 59, entire document.

Checkfree, First Data and Microsoft Join Forces to Accelerate Billing and Payment Use, Feb. 15, 2000, www.checkfree.com/newsresults/1,5872,649,00.html, 6 pages, entire document.

Intelligent Enterprise, 2, 4, 8(1), Mar. 9, 1999, 2 pages, entire document.

* cited by examiner

DISALLOW PAYMENT FOR E-BILLING SYSTEM

CROSS-REFERENCES TO RELATED APPLICATIONS

This application is related to, and claims the benefit of the earlier filing date of U.S. Provisional Patent Application (Ser. No. 60/189,225), filed Mar. 14, 2000, entitled "Disallow Payment for E-billing System," the entirety of which is incorporated herein by reference.

BACKGROUND OF THE INVENTION

1. Field of the Invention

The present invention relates to e-commerce customer-support services, and particularly, to enhanced features for a web-based billing system tool enabling customers to pay their invoices relating to telecommunications products and services on-line.

2. Discussion of the Background

Currently, there is no telecommunications enterprise or vendor providing telecommunications services that provide a fully integrated communications offering on the Internet with comprehensive product and services information, including electronic billing analysis and interactive customer support. In the area of billing for telecommunications products and services, telecommunications service enterprises provide capabilities for "on-line" electronic funds transfer (EFT) or public switched telephone network (PSTN) dial-up credit card payment of their invoices.

Existing comprehensive world-wide-web/Internet-based invoicing and payment systems (hereinafter "e-Billing") enables customers to easily receive and analyze their invoices, and, in addition, enable customers to pay their invoices, electronically via electronic funds transfer. This "e-Billing" system includes a comprehensive software and system infrastructure that provides a variety of tools for enabling customers of telecom companies to receive, analyze and pay their invoices by a variety of methods, via a single comprehensive interface.

In open item accounts receivable systems, on-line invoices are posted and customer payments are received and applied to the outstanding invoice. Currently, if a customer shows a credit or zero balance, and that customer submits a further EFT payment, an accounting problem is created in that there is no outstanding invoice to apply the received payment to. This additional payment typically requires a special accounting procedure, often triggering some sort of manual intervention in the A/R department.

It would be highly desirable to eliminate the downstream accounting problems resulting from an overpayment by employing a Disallow Payment mechanism which prevents the acceptance of customer EFT payments from those customers having a credit or zero balance.

SUMMARY OF THE INVENTION

The present invention addresses the above stated needs by providing an e-billing system including a disallow payment mechanism that prevents EFT the acceptance of customer payments from those customers having a credit or zero balance.

According to one aspect of the invention, there is provided a payment disallow mechanism for an e-billing system including a computer system accessible for on-line interactive communication of invoices to users. The computer system includes a database for storing customer invoice information, the information including an invoice date and an total invoice amount for display to said customer for on-line interaction; a mechanism for initiating electronic payment of the modified total invoice amount via the e-billing system; and a mechanism for determining whether the total invoice amount is a zero balance or credit balance prior to executing the electronic payment, wherein in response to determination of the zero or credit balance, the mechanism terminating the payment mechanism and generating a disallow payment message for display to the customer.

According to another aspect of the present invention, a method for providing an on-line billing system is disclosed. The method includes retrieving invoice information corresponding to a customer, displaying the invoice amount via a web browser, receiving an input to initiate payment corresponding to the invoice amount, determining whether the invoice amount is at least one of a zero balance and a credit balance, and selectively terminating the payment and generating a disallow payment message based upon the determining step.

According to another aspect of the present invention, a server apparatus for providing an on-line billing system is disclosed. The server apparatus includes a communication interface configured to retrieve invoice information corresponding to a customer. The server apparatus also includes a processor that is coupled to the communication interface and configured to instruct display of the invoice amount via a web browser, wherein the communication interface receives an input to initiate payment corresponding to the invoice amount. The processor determines whether the invoice amount is at least one of a zero balance and a credit balance, and selectively terminating the payment and generating a disallow payment message based upon the determination.

In yet another aspect of the present invention, an e-billing system is provided. The e-billing system includes a database that is configured to store invoice information corresponding to a customer. The system also includes a server that communicates with the database. The server is configured to retrieve the invoice information from the database, and to instruct display of the invoice amount via a web browser. Further, the system includes a client that communicates with the server. The client is configured to run the web browser and to transmit an input to the server to initiate payment corresponding to the invoice amount. The server determines whether the invoice amount is at least one of a zero balance and a credit balance. The server selectively terminates the payment and generates a disallow payment message based upon the determination.

According to yet another aspect of the present invention, a server apparatus for providing an on-line billing system is disclosed. The server apparatus includes means for retrieving invoice information corresponding to a customer; means for displaying the invoice amount via a web browser; means for receiving an input to initiate payment corresponding to the invoice amount; means for determining whether the invoice amount is at least one of a zero balance and a credit balance; and means for selectively terminating the payment and generating a disallow payment message based upon the determination.

In yet another aspect of the present invention, a computer-readable medium carrying one or more sequences of one or more instructions for providing an on-line billing system is disclosed. The one or more sequences of one or more instructions including instructions which, when executed by one or more processors, cause the one or more processors to perform the steps of retrieving invoice information corresponding to a customer; displaying the invoice amount via a web browser; receiving an input to initiate payment corresponding to the invoice amount; determining whether the invoice amount is at least one of a zero balance and a credit balance; and selectively terminating the payment and generating a disallow payment message based upon the determining step.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to an Internet-based billing system, it is recognized that the present invention has applicability to any packet switched network.

Figure 1:
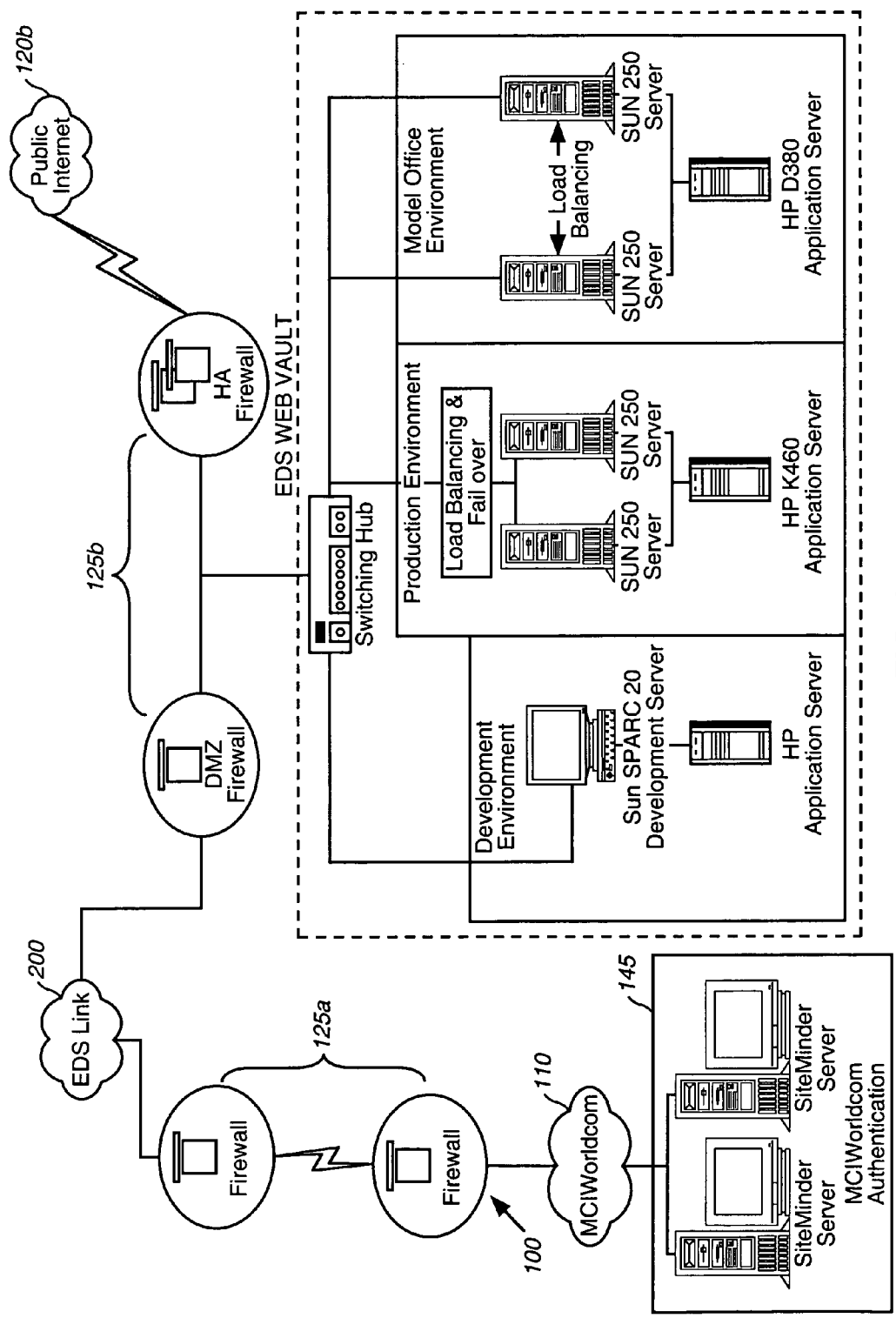
FIG. 1 is a diagram of an e-billing system architecture employing a disallow payment mechanism, in accordance with an embodiment of the present invention.

As shown in FIG. 1, there is depicted a physical hardware architecture of an exemplary e-billing system 100 (e.g., the MCIWorldcom Interact system). As shown in FIG. 1, there is provided a billing system represented as cloud 110. Relating specifically to e-Billing, a link via a double firewall 125a is provided to interface the billing system 100 with a third-party vendor electronic bill statement and presentment system 200 that functions to generate and present on-line billing invoices for customers of the telecommunications enterprise over the Internet via double firewall 125b. In operation, a file including a customers billing/invoice data is provided by the Billing system (e.g., accounts receivable department) to the third-party system 200 where web-pages including corresponding versions of the customer invoices are generated and posted on-line. Customers initially do not have access to the web based invoices. Instead, the on-line invoices are available to the enterprise audit department which checks the invoices for format compliance and billing total amount accuracy. As soon as the on-line version of the invoices are approved by the audit department, they are flagged as available on-line and the third party system 200 notifies the customer and posts the invoices on-line for the customer access. Via public Internet 120 access through the MCI "Interact" web server portal to the suite of web-based applications including the e-billing application (not shown), the customer's may pay their invoices.

Figure 2:
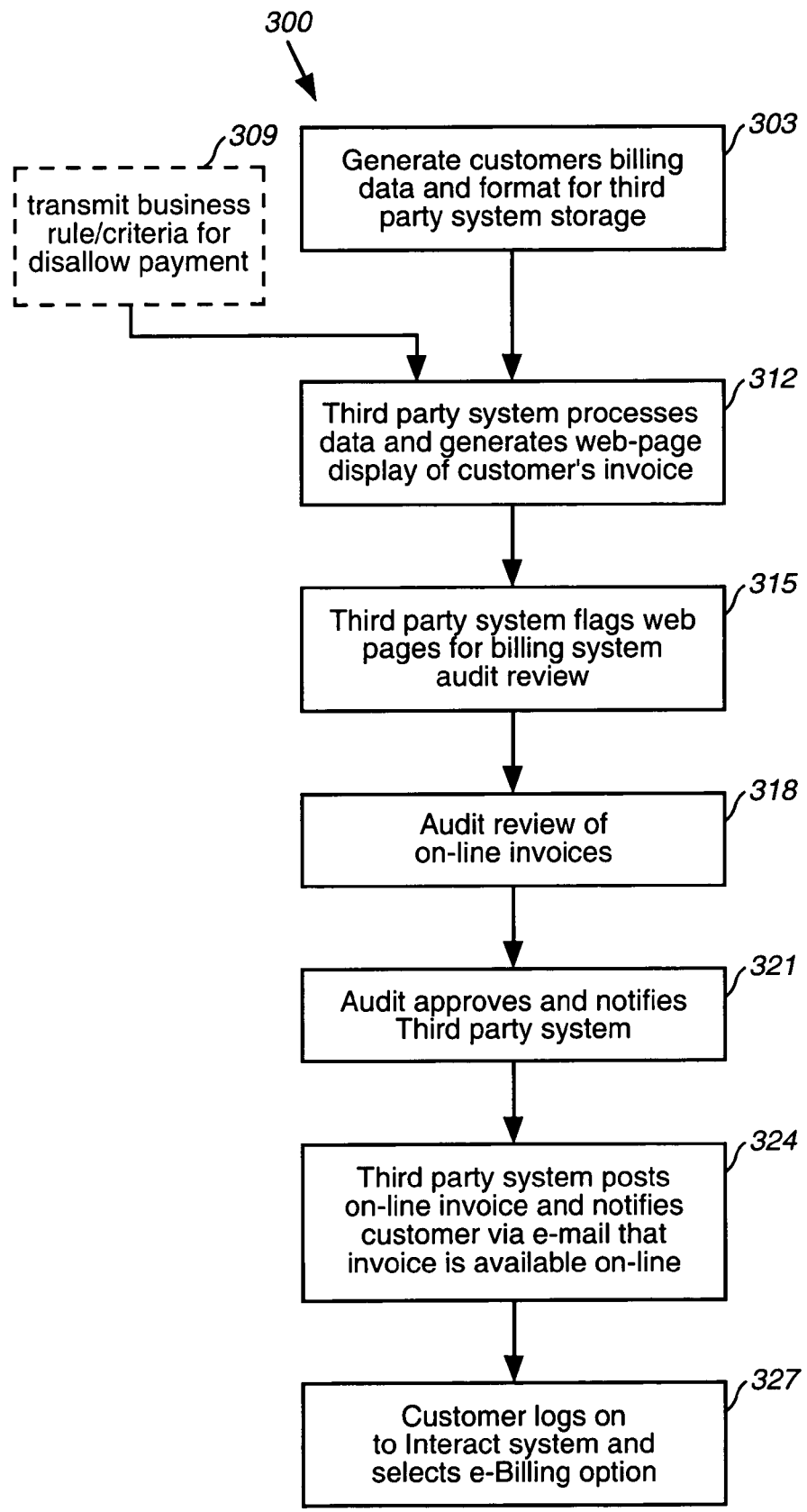
FIG. 2 is a diagram of a process for providing on-line customer invoices, according to an embodiment of the present invention.
Figure 3A:
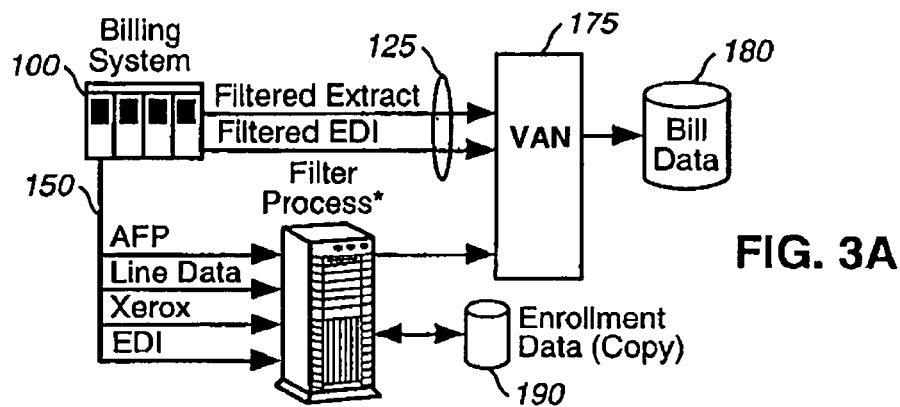
FIGS. 3(a), 3(b) and 3(c) are diagrams of an example electronic bill statement and presentment system 200 employed by a third-party for generating on-line invoices, according to an embodiment of the present invention.
Figure 3B:
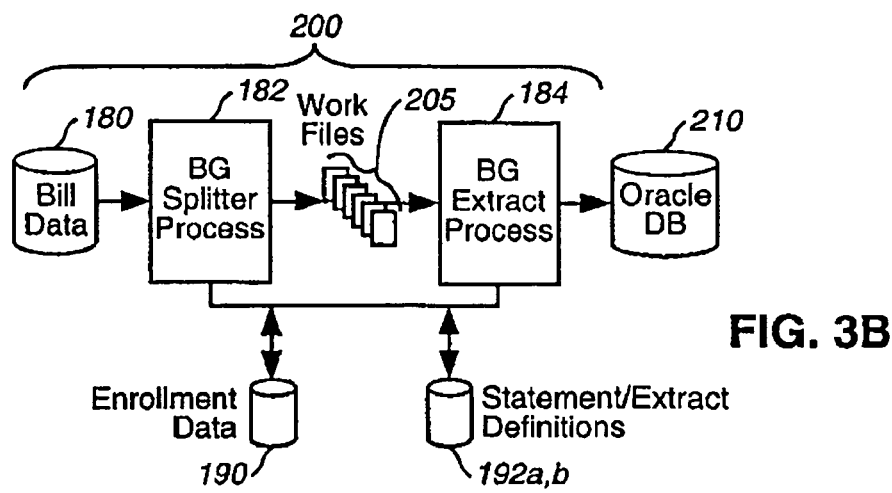
Figure 3C:
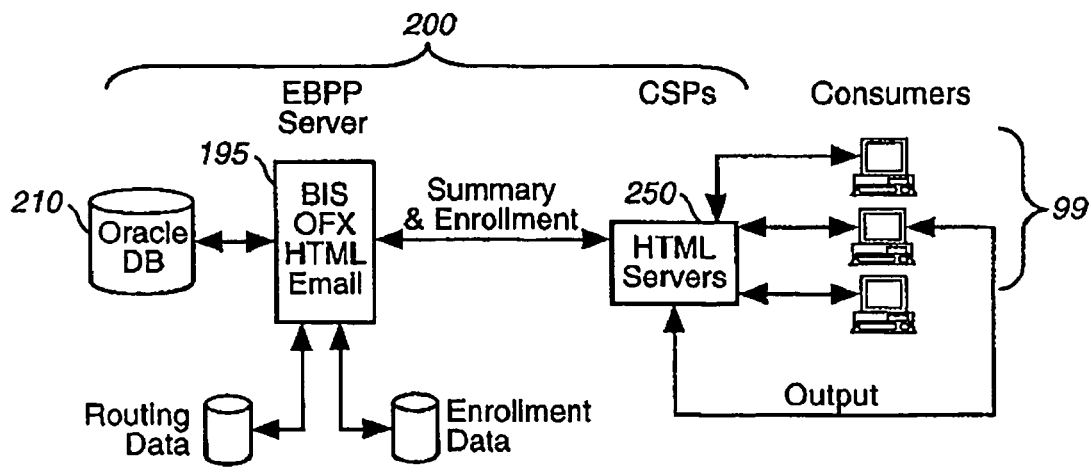

FIGS. 2, 3(a)–3(c) particularly depict a data flow summary 300 and the invoice generation process involving the billing enterprise and the third-party electronic bill statement and presentment system for generating on-line invoices that employ a disallow payment mechanism for customers having a credit balance according to the invention. As shown in FIG. 2, a first step 303 depicts generally, the step of providing the customer invoice data to the third-party electronic billing and presentment system 200 (FIG. 1). This information may be provided in flat format files to the third-party system and may comprise softcopy images of the customers paper invoices. Preferably, a process is performed whereby data is extracted from the enterprise legacy billing system 110 and transported to a common data store maintained by the third party system 200. As depicted in FIG. 3(a), there are two methods in which a billing system 110 may provide bill data to the third party e-billing payment and presentment system 200: by either providing a filtered extract 125 including only those bills destined for electronic delivery, or, they can provide a non-filtered extract 150 that includes all bills. In the latter scenario, the third-party system is required to match bill data against an enrollment store 190 as depicted in FIG. 3(a). There are several formats that the billing system may provide to the third-party system 200 including, but not limited to: AFP (IBM's Advanced format printing), Line Data, Xerox Metacode, and electronic data interchange (EDI) electronic file format. Once the extract has been completed by the billing enterprise 100, the data is then routed to the third-party system 200 for processing. Implementing known techniques, a dedicated communication circuit may be used to route this data to the third party system for high volume billers, or a Value Added Network (VAN) 175 may be implemented as well for receiving the data and routing data to the billing database. Once the data has been sent to the VAN, the third-party system 200 sweeps the assigned VAN mailbox on a regular basis to obtain bill data and load it to an interim data store 180 on an electronic bill presentment and payment ("EBPP") server 195, as shown in FIG. 3(c). As further shown in FIG. 2, at step 309, business rule criteria for implementing disallow payments is transmitted to the third-party system for application to the invoices. Then, as shown in FIG. 2, there is the step performed by the third-party system of processing the extracted customer data and generating invoices for on-line presentation. This step is depicted in greater detail in FIGS. 3(b) and 3(c).

Referring to FIG. 3(b), once customer invoice data has been loaded to the interim data store 180 on the EBPP server 180, it is parsed for loading into a database, e.g., Oracle database 210. This process involves several steps, including known processes such as facilitated by BlueGill™ software available from BlueGill Technologies, Inc, the content and disclosure of which is incorporated by reference herein. First, the raw input file is moved to a working directory that is monitored by a continuously running splitter process 182 in a server. Once the file arrives in this directory, the splitter 182 automatically begins the process of splitting the file into distinct statements, generating a single working file for each. Also during this process, the splitter parses each statement for key information such as the account number, invoice amount. The splitter process only generates a working file 205 for those statements whose account number matches with an account in the enrollment data store 190. This step assumes that a statement definition file 192a and an extract definition file 192b have been previously created and loaded to the server. These files 192a,b define how to locate key elements within the statement, and which elements will be extracted and loaded as a discreet bill on the server. Second, the working files 205 are input to a second working directory that is monitored by an extract process 184 continuously running on the server. The extract process begins processing statements as soon as the working files 205 arrive. The extract process parses through each work file (statement) based on the location of information defined in the extract definition, and extracts key elements that were defined in the statement definition. This information is then compressed into a Binary large object (BLOB) (except for key fields such as account and statement date) and loaded to the Oracle database 210 as a distinct statement record to be later accessed via a web-based server interface. Once all working files 205 have been processed, the process repeats with the next extract from the billing enterprise.

The actual generation of the final on-line (HTML) invoice is now described with respect to FIG. 3(c). As illustrated in FIG. 3(c), the third-party EBPP server 195 hosts the Oracle database 210 that warehouses all customer invoice data in a format accessible by the web-server interface. The stored bills include all necessary information to generate a complete invoice for the customer including bill summary, bill detail, and all data elements originally defined in the statement definition. A method is additionally invoked to apply business rules for determining whether the customer may receive an EPD discount, and if determined that a EPD discount is to be applied, generated additional data including the discount amount, and the discount availability period. The primary output mechanism is a web-server interface which services requests from various processes and acts as the sentry between requesting processes, e.g., an HTML server 250 and the Oracle® database 210. Compressed customer invoice data in the database is instantiated only on request via the interface which serves requests from a web application, or alternately from scheduled processes from a Consolidated Service Provider (CSP) that facilitates the transport of information.

Before bill data is presented to the customer, HTML presentation templates are implemented which serves as the "frame" within which invoice data will be presented. The invoice data includes the EPD discount data, including the amount of the discount and the discount availability period, for presentment on the on-line customer invoice.

Returning now to FIG. 2, as indicated at step 315, prior to making the on-line invoice available to the customer, the third party system informs the audit department of the billing system that the web pages containing invoice frames are available for audit/review. Audit review of the generated on-line invoice is depicted at step 318 and is typically performed manually to ensure that the generated on-line invoice conforms to the original paper invoice. At this step, a verification is made that the EPD data is correctly applied for that customer and that the EPD amount and expiration dates are correctly indicated.

Then, at step 321, if the auditing department approves of the on-line HTML version of the invoice, the third party system is notified at step 324. If an error is detected in the invoice, for example, an incorrect total invoice amount, the audit department assigns that invoice a severity code, and informs the third-party system accordingly. Based on the severity code, the third-party system will regenerate the HTML invoice, for further audit approval, e.g., for high severity codes, or correct the error and continue with the posting of the invoice to the customer.

Assuming that the audit process has approved the generated on-line invoice, a notification via e-mail is transmitted to the customer indicating that the customer's invoice is now available on-line.

Referring back to FIG. 3(c), once the approved HTML templates are loaded, the EBPP server 195 processes requests using the web application that has been developed. More particularly, the EBPP server implements the disallow payment of credit balance mechanism which, in real-time, makes a determination as to the total amount due (balance) of the customer invoice requested, and particularly, whether a credit or zero balance exists for that invoice. If the total balance meets any of these criteria, a flag is raised for that customer in the stored invoice data record in the database 210 (FIG. 3(c)) indicating that a subsequent customer attempt to pay that invoice will be prevented. Particularly, as will be explained in greater detail, in response to an e-payment initiated by the customer for the flagged invoice, a web-based display will be generated indicating that a payment is not available. It should be understood that a similar mechanism may be employed by the HTML web server 250.

As customers 99 access the Interact web site via computer devices 99 executing a web-browser (e.g., preferably including Netscape or Internet Explorer v4.0 or higher), they may first authenticate themselves by entering their User ID and password. E-billing system authorizations are based on customer profile information maintained by the system and an Interact Universal Authentication ("UA") system which implements a UA server 145 (FIG. 1) for providing a real-time interface with the e-Billing system 100.

After successful log-in and access to the e-billing system, the HTML web server receives a customer request and passes it to the web application, which in turn generates a request to the interface. The interface receives the request, processes the authentication against the enrollment store, and returns a response to the web application. The web application generates the resulting HTML invoice using the pre-built templates and serves the response to the customer.

Thus, as depicted in FIG. 2, at step 327, a customer logs in to the Interact system website and selects the e-billing option. The invoice data is populated within the HTML template, and the entire HTML page is returned to the customer 99 for viewing via HTML web server 250 (FIG. 3(c)).

Figure 4A:
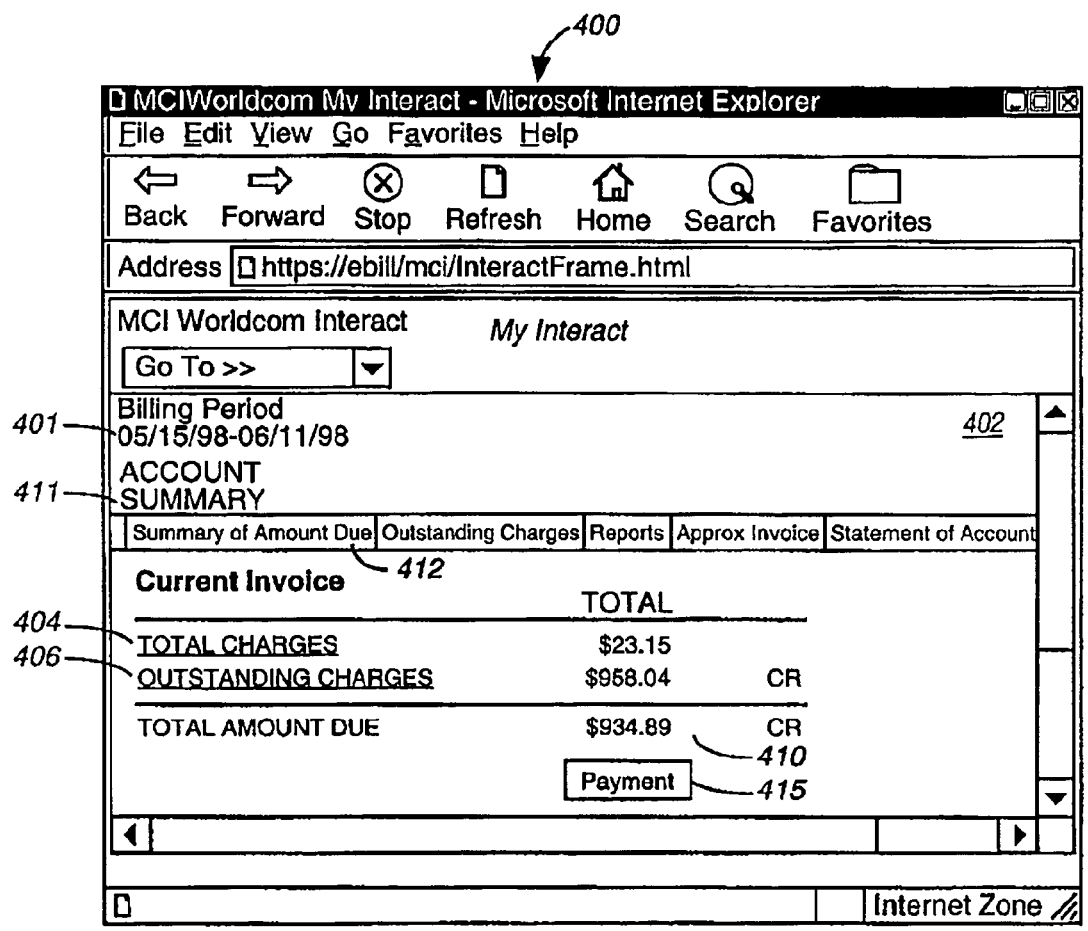
FIGS. 4(a) and 4(b) are diagrams of exemplary web pages providing the users invoice/payment screens including the disallow payment mechanism, according to an embodiment of the present invention.

FIG. 4(a) illustrates a typical "current" invoice web-based display screen 400 including html frame 402 generated in accordance with the e-billing system described herein. As shown is a bar 401 indicating the current billing period, the name of the account, the invoice date and number. Further provided are fields that are populated with the account data including: a total charges field 404 populated with the current invoice charges; a field 406 populated with the total outstanding charges amount; and, a field 410 populated with the total amount due. A "pay now" button 415 selectable by the user is provided to initiate an EFT payment against the invoice. Alternately, as shown in FIG. 4(a), from a menu bar 411 providing other user e-billing system options, the user may select a "pay invoice" button 412 for initiating payment of the invoice. As indicated in FIG. 4(a), the total outstanding charges 406 indicate a credit balance.

Figure 4B:
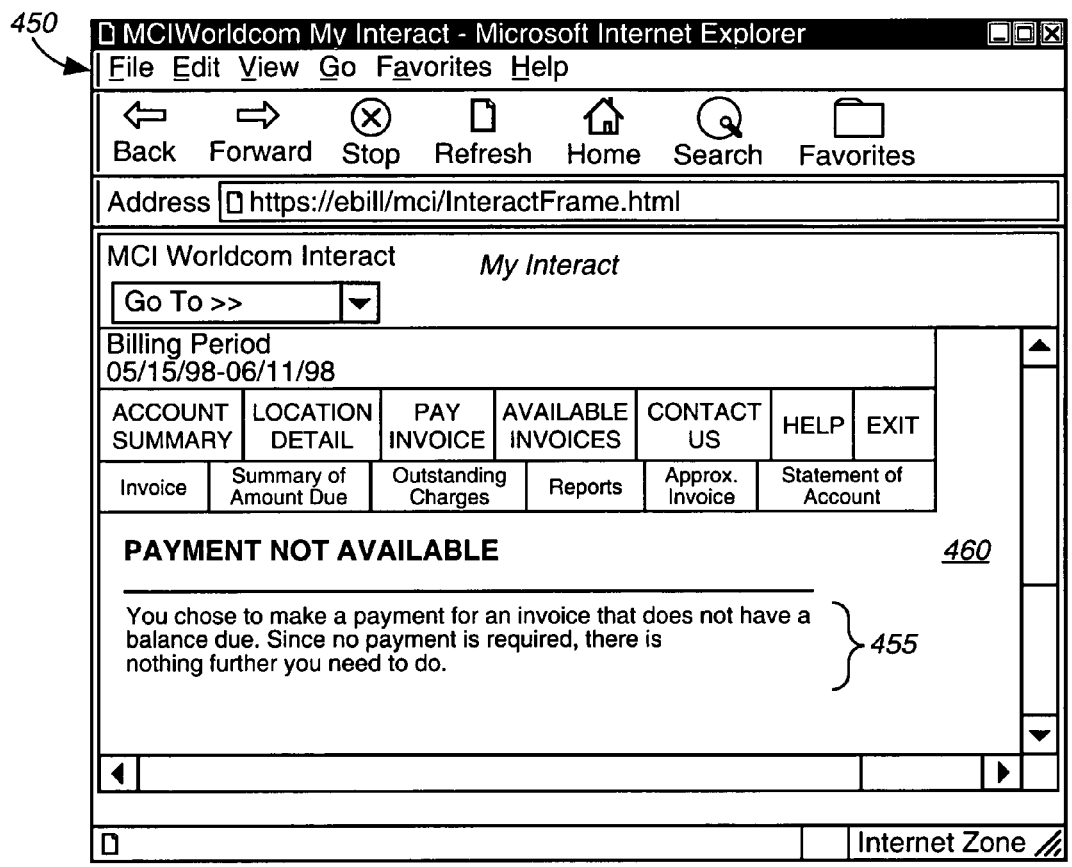

According to the invention, upon selection of either the "pay now" button 415 or, the "pay invoice" button 412, a electronic "Payment Not Available" page 450 is displayed at the user browser as illustrated in FIG. 4(b). In FIG. 4(b), the Payment Not Available page 450 includes an html frame 460 presenting the customer with information 455 regarding the disallow payment mechanism refusal to allow an EFT payment on this invoice shown in FIG. 4(a).

Figure 5:
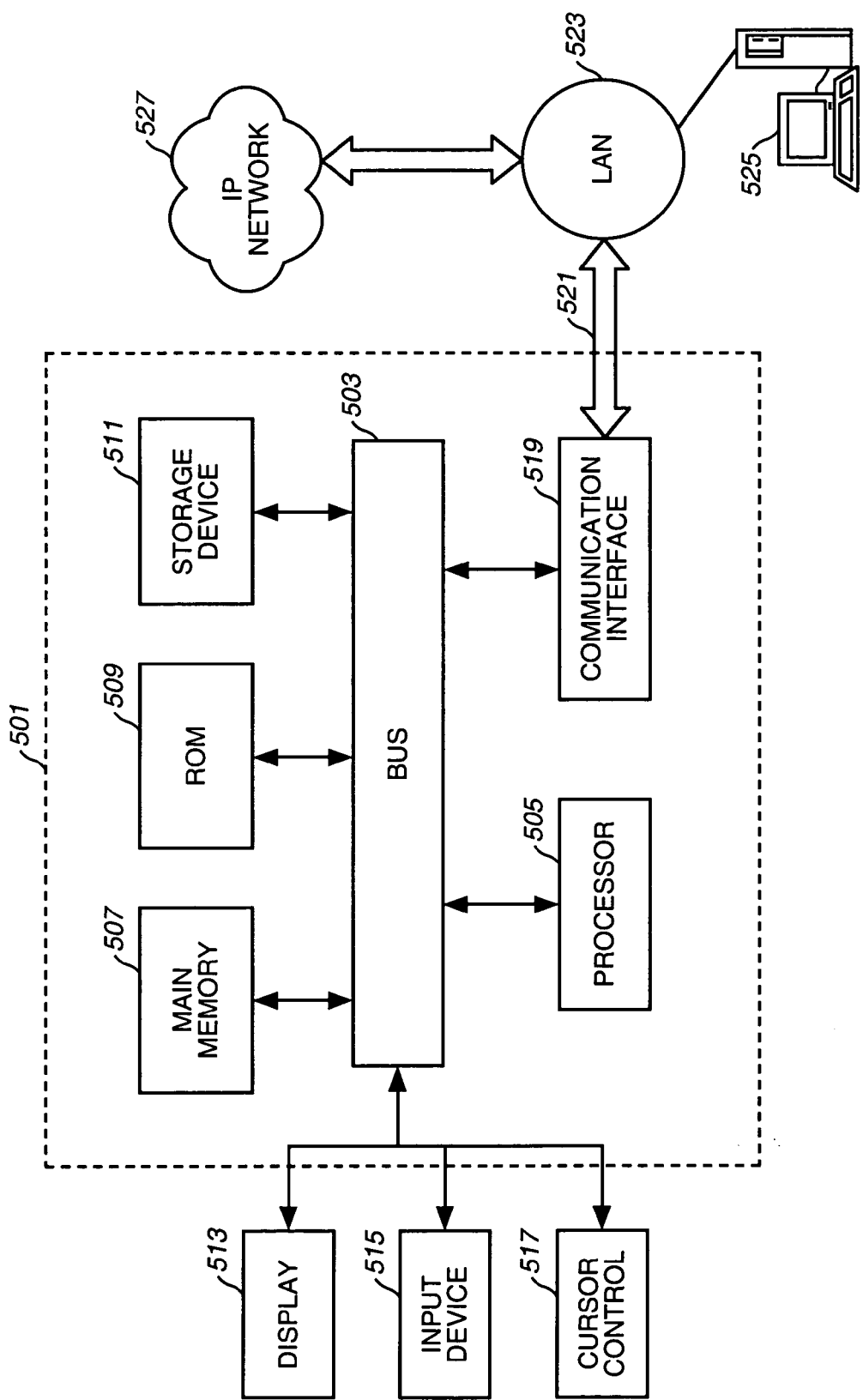
FIG. 5 is a diagram of a computer system that performs in accordance with an embodiment of the present invention.

FIG. 5 illustrates a computer system upon which an embodiment according to the present invention may be implemented. Computer system 501 includes a bus 503 or other communication mechanism for communicating information, and a processor 505 coupled with bus 503 for processing the information. Computer system 501 also includes a main memory 507, such as a random access memory (RAM) or other dynamic storage device, coupled to bus 503 for storing information and instructions to be executed by processor 505. In addition, main memory 507 may be used for storing temporary variables or other intermediate information during execution of instructions to be executed by processor 505. Computer system 501 further includes a read only memory (ROM) 509 or other static storage device coupled to bus 503 for storing static information and instructions for processor 505. A storage device 511, such as a magnetic disk or optical disk, is provided and coupled to bus 503 for storing information and instructions.

Computer system 501 may be coupled via bus 503 to a display 513, such as a cathode ray tube (CRT), for displaying information to a computer user. An input device 515, including alphanumeric and other keys, is coupled to bus 503 for communicating information and command selections to processor 505. Another type of user input device is cursor control 517, such as a mouse, a trackball, or cursor direction keys for communicating direction information and command selections to processor 505 and for controlling cursor movement on display 513.

According to one embodiment, the e-billing functions are provided by computer system 501 in response to processor 505 executing one or more sequences of one or more instructions contained in main memory 507. Such instructions may be read into main memory 507 from another computer-readable medium, such as storage device 511. Execution of the sequences of instructions contained in main memory 507 causes processor 505 to perform the process steps described herein. One or more processors in a multi-processing arrangement may also be employed to execute the sequences of instructions contained in main memory 507. In alternative embodiments, hard-wired circuitry may be used in place of or in combination with software instructions. Thus, embodiments are not limited to any specific combination of hardware circuitry and software.

Further, the functions of the e-billing system may reside on a computer-readable medium. The term "computer-readable medium" as used herein refers to any medium that participates in providing instructions to processor 505 for execution. Such a medium may take many forms, including but not limited to, non-volatile media, volatile media, and transmission media. Non-volatile media includes, for example, optical or magnetic disks, such as storage device 511. Volatile media includes dynamic memory, such as main memory 507. Transmission media includes coaxial cables, copper wire and fiber optics, including the wires that comprise bus 503. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 505 for execution. For example, the instructions may initially be carried on a magnetic disk of a remote computer. The remote computer can load the instructions relating to e-billing functions remotely into its dynamic memory and send the instructions over a telephone line using a modem. A modem local to computer system 501 can receive the data on the telephone line and use an infrared transmitter to convert the data to an infrared signal. An infrared detector coupled to bus 503 can receive the data carried in the infrared signal and place the data on bus 503. Bus 503 carries the data to main memory 507, from which processor 505 retrieves and executes the instructions. The instructions received by main memory 507 may optionally be stored on storage device 511 either before or after execution by processor 505.

Computer system 501 also includes a communication interface 519 coupled to bus 503. Communication interface 519 provides a two-way data communication coupling to a network link 521 that is connected to a local network 523. For example, communication interface 519 may be a network interface card to attach to any packet switched local area network (LAN). As another example, communication interface 519 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 519 sends and receives electrical, electromagnetic or optical signals that carry digital data streams representing various types of information.

Network link 521 typically provides data communication through one or more networks to other data devices. For example, network link 521 may provide a connection through local network 523 to a host computer 525 or to data equipment operated by a service provider, which provides data communication services through a communication network 527 (e.g., the Internet). LAN 523 and network 527 both use electrical, electromagnetic or optical signals that carry digital data streams. The signals through the various networks and the signals on network link 521 and through communication interface 519, which carry the digital data to and from computer system 501, are exemplary forms of carrier waves transporting the information. Computer system 501 can transmit notifications and receive data, including program code, through the network(s), network link 521 and communication interface 519.

The techniques described herein provide several advantages over prior approaches to executing payment of bills over an on-line system. This arrangement advantageously provides an integrated e-billing system for payment and analysis of invoice information.

While the invention has been particularly shown and described with respect to preferred embodiments thereof, it will be understood by those skilled in the art that the foregoing and other changes in form and details may be made therein without departing from the spirit and scope of the invention. More specifically, the system administrative and disallow payment mechanism described may apply to any generic applications available via the Web and is not limited to the telecommunications industry.

What is claimed is:

1. A method for providing an on-line billing system, the method comprising:
    retrieving invoice information corresponding to a customer;
    displaying the invoice amount via a web browser;
    receiving an input to initiate payment corresponding to the invoice amount;
    determining whether the invoice amount is a zero balance or a credit balance; and
    selectively terminating the payment and generating a disallow payment message based upon the determining step.

2. The method according to claim 1, wherein the determining step comprises:
    applying business rules in real-time.

3. The method according to claim 1, further comprising:
    loading the invoice information into an interim data store; and
    parsing the invoice information for loading into a database.

4. The method according to claim 3, further comprising:
    performing a splitter process to parse the invoice information for account number information and invoice amount associated with the customer, wherein a working file is selectively generated based upon comparison of the invoice information with data that is stored in a data store containing enrollment information; and
    performing an extract process to parse the generated working file based upon a pre-defined extract definition.

5. The method according to claim 1, further comprising:
    calculating a discount for early payment of an invoice amount associated with the invoice information; and
    selectively applying the discount based discount business rules.

6. The method according to claim 1, further comprising:
    generating an HTML (Hypertext Markup Language) invoice page containing the invoice information.

7. The method according to claim 6, further comprising:
    auditing the HTML invoice page to determine whether a billing error exists;
    generating a severity code associated with the billing error; and
    regenerating the HTML invoice page to correct the billing error.

8. A server apparatus for providing an on-line billing system, the server apparatus comprising:
    a communication interface configured to retrieve invoice information corresponding to a customer; and
    a processor coupled to the communication interface and configured to instruct display of the invoice amount via a web browser;
    wherein the communication interface receives an input to initiate payment corresponding to the invoice amount, the processor determining whether the invoice amount is a zero balance or a credit balance, and selectively terminating the payment and generating a disallow payment message based upon the determination.

9. The server apparatus according to claim 8, wherein the processor is configured to apply business rules in real-time to determine whether the invoice amount is the zero balance or the credit balance.

10. The server apparatus according to claim 8, wherein the invoice information is stored in an interim data store, the invoice information being parsed for loading into a database.

11. The server apparatus according to claim 10, wherein the processor is configured to perform a splitter process to parse the invoice information for account number information and invoice amount associated with the customer, a working file being selectively generated based upon comparison of the invoice information with data that is stored in a data store containing enrollment information, the processor being configured to perform an extract process to parse the generated working file based upon a pre-defined extract definition.

12. The server apparatus according to claim 8, wherein the processor is configured to calculate a discount for early payment of an invoice amount associated with the invoice information, and to selectively apply the discount based discount business rules.

13. The server apparatus according to claim 8, wherein the processor is configured to generate an HTML (Hypertext Markup Language) invoice page containing the invoice information.

14. The server apparatus according to claim 13, wherein the HTML invoice page is audited to determine whether a billing error exists, the processor being configured to generate a severity code associated with the billing error and to regenerate the HTML invoice page to correct the billing error.

15. An e-billing system comprising:
    a database configured to store invoice information corresponding to a customer;
    a server communicating with the database, the server being configured to retrieve the invoice information from the database, the server being configured to instruct display of the invoice amount via a web browser; and
    a client communicating with the server, the client being configured to run the web browser and to transmit an input to the server to initiate payment corresponding to the invoice amount, the server determining whether the invoice amount is a zero balance or a credit balance, and selectively terminating the payment and generating a disallow payment message based upon the determination.

16. The system according to claim 15, wherein the server is configured to apply business rules in real-time to determine whether the invoice amount is the zero balance or the credit balance.

17. The system according to claim 15, wherein the invoice information is stored in an interim data store, the invoice information being parsed for loading into the database.

18. The system according to claim 17, wherein the server is configured to perform a splitter process to parse the invoice information for account number information and invoice amount associated with the customer, a working file being selectively generated based upon comparison of the invoice information with data that is stored in a data store containing enrollment information, the server being configured to perform an extract process to parse the generated working file based upon a pre-defined extract definition.

19. The system according to claim 15, wherein the server is configured to calculate a discount for early payment of an invoice amount associated with the invoice information, and to selectively apply the discount based discount business rules.

20. The system according to claim 15, wherein the server is configured to generate an HTML (Hypertext Markup Language) invoice page containing the invoice information.

21. The system according to claim 20, wherein the HTML invoice page is audited to determine whether a billing error exists, the server being configured to generate a severity code associated with the billing error and to regenerate the HTML invoice page to correct the billing error.

22. A server apparatus for providing an on-line billing system, the server apparatus comprising:
    means for retrieving invoice information corresponding to a customer;
    means for displaying the invoice amount via a web browser;
    means for receiving an input to initiate payment corresponding to the invoice amount;
    means for determining whether the invoice amount is a zero balance or a credit balance; and
    means for selectively terminating the payment and generating a disallow payment message based upon the determination.

23. The server apparatus according to claim 22, wherein the determining means comprises:
    means for applying business rules in real-time.

24. The server apparatus according to claim 22, further comprising:
    means for loading the invoice information into an interim data store; and
    means for parsing the invoice information for loading into a database.

25. The server apparatus according to claim 24, further comprising:
    means for performing a splitter process to parse the invoice information for account number information and invoice amount associated with the customer, wherein a working file is selectively generated based upon comparison of the invoice information with data that is stored in a data store containing enrollment information; and
    means for performing an extract process to parse the generated working file based upon a pre-defined extract definition.

26. The server apparatus according to claim 22, further comprising:
    means for calculating a discount for early payment of an invoice amount associated with the invoice information; and
    means for selectively applying the discount based discount business rules.

27. The server apparatus according to claim 22, further comprising:
    means for generating an HTML (Hypertext Markup Language) invoice page containing the invoice information.

28. The server apparatus according to claim 27, further comprising:
    means for auditing the HTML invoice page to determine whether a billing error exists; and
    means for generating a severity code associated with the billing error, wherein the generating means regenerates the HTML invoice page to correct the billing error.

29. A computer-readable medium carrying one or more sequences of one or more instructions for providing an on-line billing system, the one or more sequences of one or more instructions including instructions which, when executed by one or more processors, cause the one or more processors to perform the steps of:
    retrieving invoice information corresponding to a customer;
    displaying the invoice amount via a web browser;
    receiving an input to initiate payment corresponding to the invoice amount;
    determining whether the invoice amount is a zero balance or a credit balance; and
    selectively terminating the payment and generating a disallow payment message based upon the determining step.

30. The computer-readable medium according to claim 29, wherein the determining step comprises:
    applying business rules in real-time.

31. The computer-readable medium according to claim 29, wherein the one or more processors further perform the steps of:
    loading the invoice information into an interim data store; and
    parsing the invoice information for loading into a database.

32. The computer-readable medium according to claim 31, wherein the one or more processors further perform the steps of:
    performing a splitter process to parse the invoice information for account number information and invoice amount associated with the customer, wherein a working file is selectively generated based upon comparison of the invoice information with data that is stored in a data store containing enrollment information; and
    performing an extract process to parse the generated working file based upon a pre-defined extract definition.

33. The computer-readable medium according to claim 29, wherein the one or more processors further perform the steps of:
    calculating a discount for early payment of an invoice amount associated with the invoice information; and
    selectively applying the discount based discount business rules.

34. The computer-readable medium according to claim 29, wherein the one or more processors further perform the step of:
    generating an HTML (Hypertext Markup Language) invoice page containing the invoice information.

35. The computer-readable medium according to claim 34, wherein the one or more processors further perform the steps of:
    auditing the HTML invoice page to determine whether a billing error exists;
    generating a severity code associated with the billing error; and
    regenerating the HTML invoice page to correct the billing error.

36. A payment disallow mechanism for an e-billing system including a computer system accessible for on-line interactive communication of invoices to users, the computer system comprising:

a database for storing customer invoice information, the information including an invoice date and a total invoice amount, the invoice information displayed to the customer for on-line interaction;

a mechanism for initiating electronic payment of a modified total invoice amount via the e-billing system, and a mechanism for determining whether the total invoice amount is a zero balance or credit balance prior to executing the electronic payment, wherein in response to determination of the zero or credit balance, the mechanism terminating the payment mechanism and generating a disallow payment message for display to the customer.

37. The payment disallow mechanism according to claim 36, wherein the mechanism for determining the total invoice amount implemented in a web server providing the on-line interactive communication.

* * * * *